United States Patent Office 2,890,194
Patented June 9, 1959

2,890,194

COMPOSITIONS OF EPOXIDES AND POLY-CARBOXYLIC ACID COMPOUNDS

Benjamin Phillips, Charleston, Frederick C. Frostick, Jr., South Charleston, Charles W. McGary, Jr., Charleston, and Charles T. Patrick, Jr., St. Albans, W. Va., assignors to Union Carbide Corporation, a corporation of New York No Drawing. Application May 24, 1956
Serial No. 586,931

34 Claims. (Cl. 260—45.4)

This invention relates to novel polymerizable, curable compositions; polymerized, cured, compositions prepared therefrom and methods of producing the same. More particularly, this invention is directed to novel polymerizable, curable, epoxy resin compositions useful in the arts of moldings, coatings, laminates and adhesives and the like.

The novel compositions of the present invention are directed to polymerizable, curable, compositions comprising (a) 3,4-epoxycyclohexylmethyl 3,4-epoxycyclohexanecarboxylates; (b) a polycarboxylic acid compound, in an amount having $y$ carboxyl equivalents per epoxy equivalent of said diepoxide; and (c) a polycarboxylic acid anhydride in an amount having $x$ carboxyl equivalents per epoxy equivalent of said diepoxide, wherein $y$ is a number in the range of from 0.1 to 1.5; $x$ is a number in the range of from 0.0 to 1.0; the sum of $x$ and $y$ is not greater than 2.0 and $x/y$ is less than 1.

Preferred compositions of this invention are directed to polymerizable, curable, compositions comprising (a) 3,4-epoxycyclohexylmethyl 3,4-epoxycyclohexanecarboxylates; (b) a polycarboxylic acid compound in an amount having $y$ carboxyl equivalents per epoxy equivalent of said diepoxide; and (c) a polycarboxylic acid anhydride in an amount having $x$ carboxyl equivalents per epoxy equivalent of said diepoxide wherein $y$ is a number in the range of from 0.4 to 1.0; $x$ is a number in the range of from 0.0 to 0.5; the sum of $x$ and $y$ is not greater than 1.0 and $x/y$ is less than 1.

Particularly preferred compositions to which this invention is directed are compositions comprising (a) lower alkyl substituted 3,4-epoxycyclohexylmethyl 3,4-epoxycyclohexanecarboxylates; (b) a polycarboxylic acid, and preferably a dicarboxylic acid in an amount having $y$ carboxyl equivalents per epoxy equivalent of said diepoxide; and (c) a polycarboxylic acid anhydride in an amount having $x$ carboxyl equivalents per epoxy equivalent of said diepoxide wherein $y$ is a number in the range of from 0.1 to 1.5; $x$ is a number in the range of from 0.0 to 1.0; the sum of $x$ and $y$ is not greater than 2.0 and $x/y$ is less than 1.

Most particularly preferred compositions to which this invention is directed are compositions comprising (a) 3,4-epoxy-6-methylcyclohexylmethyl 3,4-epoxy-6-methylcyclohexanecarboxylate; (b) a polycarboxylic acid compound in an amount having $y$ carboxyl equivalents per epoxy equivalent of said diepoxide; and (c) a polycarboxylic acid anhydride in an amount having $x$ carboxyl equivalents per epoxy equivalent of said diepoxide wherein $y$ is a number in the range of from 0.1 to 1.5 and preferably in the range of from 0.4 to 1.0; $y$ is a number in the range of from 0.0 to 1.0; the sum of $x$ and $y$ is not greater than 2.0 and preferably not greater than 1.0 and $x/y$ is less than 1.

The novel compositions of this invention also include and are directed to the cured compositions hereinbefore referred to.

Preferred embodiments of this invention comprise the cured resin compositions containing a plurality of interconnecting units corresponding to the general formula:

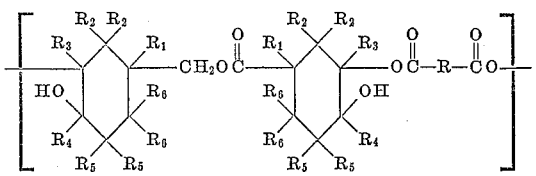

wherein $R_1$ through $R_6$ represent hydrogen and alkyl groups and preferably lower alkyl groups and R represents the residue of a dicarboxylic acid.

It will be noted that at each epoxide site in the starting material there is made available a site for initiation of a linear type chain and also makes available another site for cross-linking purposes. The cross-linking can be accomplished by reaction with other epoxides such as diepoxides and polyepoxides; dibasic acids and the like.

The present invention is based on the discovery that thermosetting, rigid, moldable solid polyester type compositions can be obtained by heating, in the presence or absence of a catalyst, a 3,4-epoxycyclohexylmethyl 3,4-epoxycyclohexanecarboxylate and a polycarboxylic acid compound in molar proportions of 0.10 to 1.5 moles of polycarboxylic acid compound per mole of diepoxide. It has also been discovered that on further heating in the presence or absence of a catalyst these compositions are converted into hard, transparent, water resistant, infusible scratch resistance resins having superior high temperature characteristics making them admirably suitable for use in industrial applications where high heat distortion points are a prime requisite such as, for example, in high temperature molding operations.

It has also been discovered that the diepoxide-polycarboxylic acid compound systems can be modified, so as to provide a variety of useful physical properties, by the inclusion or addition of a polycarboxylic acid anhydride in an amount of from 0.0 to 1.0 mole of polycarboxylic acid anhydride per mole of diepoxide.

The proportions of the reactants employed in preparing the novel compositions of this invention are preferably expresssed in terms of available carboxyl groups or carboxyl equivalent per available epoxy group or epoxy equivalent. By the term "carboxyl equivalent," as employed herein, is meant the number of carboxyl groups contained by an amount of a polycarboxylic compound. For example, the "carboxyl equivalent" of a dicarboxylic acid is two. In the case of a dicarboxylic acid anhydride, the term "carboxyl equivalent" is meant to indicate the number of carboxyl groups which would be contained by an amount of the corresponding dicarboxylic acid. Thus, for example, one mole of a dicarboxylic acid anhydride would have a "carboxyl equivalent" of two. Also, as employed herein, the term "epoxy equivalent" is intended to represent the number of epoxy groups,

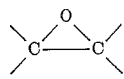

contained by an amount of epoxide compound. Thus in the diepoxide-polycarboxylic acid compound systems modified or unmodified by the addition of a polycarboxylic acid anhydride the terms $y$ and $x$ are employed to signify carboxyl equivalents of the polycarboxylic acid compound and polycarboxylic acid anhydride respectively per epoxide equivalent. Thus, since it has been discovered that useful compositions are obtained employing molar proportions in the range of 0.1 to 1.5 moles of polycarboxylic acid per mole of diepoxide, $y$ will be a number in the range of 0.1 to 1.5 carboxyl equivalents per epoxy equivalent. Upon the addition, if desired, of a modifying polycarboxylic acid anhydride, the amount of polycarboxylic acid compound must, of course, be correspondingly decreased keeping in mind that one carboxyl equivalent of acid is the equivalent of 2 carboxyl equivalents of anhydride in reacting with the epoxide. Thus, since it has been discovered that useful compositions are obtainable by the addition to the diepoxide-polycarboxylic acid compound systems of from 0.0 to 1.0 moles of polycarboxylic acid anhydride per mole of diepoxide, $x$, therefore will be a number in the range of from 0.0 to 1.0 carboxyl equivalents per epoxy equivalent. The sum of $x$ plus $y$ is not greater than 2.0 since it has been observed that resins obtained outside of the range are unsuitable because they are heterogeneous in composition. Furthermore the ratio of $x/y$ must be less than 1 since the polycarboxylic acid compound is a major component of the system.

The initial diepoxide-polycarboxylic acid compound systems of the present invention either modified or unmodified by the addition of a polycarboxylic acid anhydride are fluid, having viscosities of less than about 25 centipoises at working temperature. The reaction rate and physical properties are equally as good as if not better than commercially available epoxide systems.

Theoretically, the diepoxides are tetrafunctional with dicarboxylic acid anhydrides and difunctional with polycarboxylic acid compounds but, practically, other competing reactions can also occur thereby reducing the amount of the polycarboxylic acid anhydride or polycarboxylic acid compound necessary to produce useful compositions. While not wishing to be bound by any particular theory or mechanism of reaction, the amounts of dicarboxylic acid anhydride and polycarboxylic acid specified in $x$ and $y$, referred to above, can probably be explained as due to etherification and perhaps rearrangement of epoxides.

The diepoxides used in preparing the novel compositions of this invention include the 3,4-epoxycyclohexylmethyl 3,4-epoxycyclohexanecarboxylates and are free of functional group other than epoxy. They are readily prepared by the action of peracetic acid and an unsaturated cycloaliphatic ester such as, 3-cyclohexenylmethyl 3-cyclohexenecarboxylate. These unsaturated cycloaliphatic esters are also readily prepared by subjecting selected cyclic unsaturated aldehydes to the Tischenko reaction in the presence of an aluminum alkoxide catalyst. The 3,4-epoxycyclohexylmethyl 3,4-epoxycyclohexanecarboxylates obtainable by this procedure include 3,4-epoxycyclohexylmethyl 3,4-epoxycyclohexanecarboxylate and the alkyl-substituted, and preferably the lower alkyl-substituted homologs thereof such as for example, 3,4-epoxy-1-methylcyclohexylmethyl 3,4-epoxy-1-methylcyclohexanecarboxylate, 3,4-epoxy-2 or 5-methylcyclohexylmethyl 3,4-epoxy-2 or 5-methylcyclohexanecarboxylate, 3,4-epoxy-3 - methylcyclohexylmethyl 3,4-epoxy-3 - methylcyclohexanecarboxylate, 3,4 - epoxy-4-methylcyclohexylmethyl 3,4-epoxy-4 - methylcyclohexanecarboxylate, and 3,4-epoxy-6-methylcyclohexylmethyl 3,4-epoxy-6-methylcyclohexanecarboxylate.

The polycarboxylic acid compounds which can be used in preparing the novel compositions of this invention include aliphatic, aromatic and cycloaliphatic dicarboxylic acids such as, for example, oxalic acid, malonic acid, succinic acid, glutaric acid, adipic acid, pimelic acid, suberic acid, azelaic acid, sebacic acid, alkylsuccinic acids, alkenylsuccinic acids, maleic acid, fumaric acid, itaconic acid, citraconic acid, mesaconic acid, glutaconic acid, muconic acid, ethylidenemalonic acid, isopropylidenemalonic acid, allylmalonic acid, 1,2-cyclohexanedicarboxylic acid, 1,4-cyclohexanedicarboxylic acid, 2-carboxy-2-methylcyclohexaneacetic, phthalic acid, isophthalic acid, terephthalic acid, 1,8-naphthalenedicarboxylic acid, 3-carboxycinnamic acid, 1,2-naphthalene dicarboxylic acid, tetrahydrophthalic acid, and tetrachlorophthalic acid. Preferred aliphatic dicarboxylic acids include aliphatic dibasic acids containing from five through ten carbon atoms. Other suitable polycarboxylic acid compounds include tricarboxylic acids such as 1,1,5-pentanetricarboxylic acid, 1,2,4-hexanetricarboxylic acid, 2-propyl-1,2,4-pentanetricarboxylic acid, 5-octene-3,3,6-tricarboxylic acid, 1,2,3-propanetricarboxylic acid, 1,2,4-benzenetricarboxylic acid and the like. Other suitable polycarboxylic acid compounds include polycarboxy acid-esters or polyesters containing carboxylic acid end groups prepared by the reaction of an acid or acid anhydride and a polyhydric alcohol. Typical polyhydric alcohols which can be reacted with any of the above-mentioned polycarboxylic acid or polycarboxylic acid anhydrides to provide acid-esters or polyesters containing carboxylic acid end groups suitable for use in preparing the novel compositions of this invention include ethylene glycol, diethylene glycol, triethylene glycol, tetraethylene glycol, 1,2-propylene glycol, 1,3-propylene glycol, dipropylene glycol, tripropylene glycol, 1,2-butylene glycol, 1,4-butanediol, 1,5-pentanediol, 2,4-pentanediol, 2,2,-dimethyltrimethylene glycol, 1,5-hexanediol, 2,5-hexanediol, 1,6-hexanediol, 3-methyl-1,5-pentanediol, 2-methylpentane-2,5-diol, 3-methylpentane-2,5-diol, 1,4-hexanediol, 2,2-diethyl-1,3 - propanediol, 2 - methoxymethyl-2,4 - dimethylpentane-1,5-diol, 2-ethoxymethyl-2,4-dimethylpentane-1,5-diol, 2-ethyl-1,3-hexanediol, 2,5-dimethylhexane-2,5-diol, octadecane-1,12-diol, glycerol, 1,2,6-hexanetriol, 1,1,1-trimethylol propane, trimethylol methane, pentaerythritol, dipentaerythritol, diglycerol, pentaglycerol, sorbitol, mannitol polyvinyl alcohol of varying molecular weights and the like.

Preferred polycarboxy acid-esters or polyesters containing carboxyl end groups are those prepared from the dicarboxylic acids or dicarboxylic acid anhydrides enumerated above and dihydric, trihydric and tetrahydric alcohols.

The ratios, in which the dicarboxylic acid or dicarboxylic acid anhydride can be reacted with polyhydric alcohols of the type referred to above, are limited to those which provide carboxyl end groups. Thus, the dicarboxylic acid or dicarboxylic acid anhydride must be reacted with the polyhydric alcohol in greater than equivalent amounts and care must be taken, in the case of tri and tetrafunctional reactants, that gelation does not occur due to the formation of crosslinked polyesters. The acid-ester or polyester must be soluble in the diepoxide-acid anhydride. It has been discovered that suitable polyesters can be prepared provided the mol ratios ranges prescribed in the accompanying Table I are observed:

TABLE I

| Alcohol | Mol Ratio of Acid or Anhydride/Alcohol | |
|---|---|---|
| | Usable | Preferred |
| dihydric | 1.1 to 2.0 | 1.5 to 2.0 |
| trihydric | 2.2 to 3.0 | 2.5 to 3.0 |
| tetrahydric | 3.3 to 4.0 | 3.5 to 4.0 |

The polycarboxylic acid anhydrides used in preparing the novel compositions of this invention include any and all anhydrides whether aliphatic, aromatic or cycloaliphatic in nature. The preferred anhydrides are the dicarboxylic acid anhydrides and preferably the hydrocarbon dicarboxylic acid anhydrides, which include for example, phthalic anhydride, tetrahydrophthalic anhydride, hexahydrophthalic anhydride, chlorendic anhydride, maleic anhydride, chloromaleic anhydride, dichloromaleic anhydride, glutaric anhydride, adipic anhydride, succinic anhydride, itaconic anhydride, heptyl succinic anhydride, hexylsuccinic anhydride, methylbutylsuccinic anhydride, methyltetrahydrophthalic anhydride, nonenylsuccinic anhydride, octenylsuccinic anhydride, pentenylsuccinic anhydride, propylsuccinic anhydride, 1,2,4,5-benzentetracarboxylic dianhydride, citraconic anhydride, 4-nitrophthalic anhydride, 1,2-naphthalic anhydride, 2,3-naphthalic anhydride, 1,8-naphthalic anhydride, tetrabromophthalic anhydride, and tetraiodophthalic anhydride. Polymeric anhydrides or mixed polymeric anhydrides of sebacic, adipic, pimelic, cyclohexane 1,4-dicarboxylic, terephthalic and isophthalic acids are also useful in preparing the novel compositions of this invention.

The process of this invention is carried out, generally, by heating to a temperature of about 25° C. to 200° C., a mixture comprising a 3,4-epoxycyclohexylmethyl 3,4-epoxycyclohexanecarboxylate and a polycarboxylic acid compound. The preferred minimum temperature is that temperature at which the particular reaction mixture forms a homogeneous mass. Thus, with aliphatic acids, such as, glutaric acid temperatures of at least 40° C. are preferred, while with higher-melting adipic acid, temperatures of about 80° C. to 100° C. are required. The temperature range will vary then from room temperature to 200° C. depending on the particular polycarboxylic acid compound used and upon the speed of cure desired. After gelation occurs or after a homogeneous mixture has been poured into a mold, it is generally advantageous to employ a higher temperature to complete the cure more rapidly. While temperatures up to 250° C. can be employed, a temperature in the range of from 130° C. to 180° C. is preferred. Complete cures can generally be obtained in thirty minutes to twenty-four hours.

It has been found that in certain instances that the polycarboxylic acid compound reacts so rapidly with the diepoxide that a completely homogeneous mass cannot be formed prior to gelation. But, however, the acid compound may be suitably dissolved in a solvent so that the reaction is slowed down to allow for the formation of a homogeneous mass.

The following examples will serve to illustrate the practice of the invention.

*Example 1*

PREPARATION OF 3,4-EPOXYCYCLOHEXYLMETHYL 3,4-EPOXYCYCLOHEXANECARBOXYLATE

To 144 grams (0.655 mol) of 3-cyclohexenylmethyl 3-cyclohexenecarboxylate in a 1-liter flask was added dropwise over a period of two and one-fourth hours 488 grams of a 25.5 percent solution of peracetic acid in acetone (124 grams, 1.64 mols, of peracetic acid). The stirred reaction solution was maintained at 20° C.–25° C. by immersing the reaction flask in a cold water bath. After the addition was complete, the reaction flask was immersed in a cold bath (—11° C.) and allowed to stand for 16 hours. The contents of the flask were then added dropwise to a still kettle containing ethyl benzene refluxing under reduced pressure at 40° C.–45° C. kettle temperature. During the addition, there was distilled off at the head a mixture of acetone, acetic acid, peracetic acid and ethyl benzene. After addition was complete, the remaining low-boiling materials were distilled off, and there was obtained 164 grams of residue product analyzing 86 percent purity as 3,4-epoxycyclohexylmethyl 3,4-epoxycyclohexanecarboxylate by determination of epoxide groups, 10.7 percent unreacted 3-cyclohexenylmethyl 3-cyclohexenecarboxylate by determination of double bonds, and 0.2 percent acidic impurities calculated acetic acid. The yield of diepoxide was 85.5 percent.

*Example 2*

PREPARATION OF 3,4-EPOXY-1-METHYLCYCLOHEXYLMETHYL 3,4-EPOXY-1-METHYLCYCLOHEXANECARBOXYLATE

To 84 grams (0.338 mol) of 1-methyl-3-cyclohexenylmethyl 1-methyl-3-cyclohexenecarboxylate in a one-liter flask was added dropwise over a period of one and one-half hours 308 grams of a 25 percent solution of peracetic acid in acetone (77 grams, 1.01 mols, of peracetic acid). The stirred reaction solution was maintained at 35° C.–40° C. by immersing the reaction flask in a water bath. After the addition was complete, the reaction solution was stirred at 35° C.–40° C. for 1½ hours and then stored at —11° C. for 16 hours. Analysis at this time indicated 89.6 percent of the theoretical amount of peracetic acid had reacted. The reaction solution was heated to 40° C. and stirred for another two hours at which time analysis for peracetic acid showed 94.5 percent had reacted. The solution was added dropwise to a still kettle containing 4400 grams of ethylbenzene refluxing under reduced pressure at 40° C.–45° C. kettle temperature. During the addition, there was distilled off at the head a mixture of acetone, acetic acid, peracetic acid and ethylbenzene. After addition was complete, the remaining low-boiling materials were distilled off, and there was obtained 97 grams of residue product analyzing 82 percent 3,4-epoxy-1-methylcyclohexylmethyl 3,4-epoxy-1-methylcyclohexanecarboxylate by determination of epoxide groups, 1.6 percent unreacted 1-methyl-3-cyclohexenylmethyl 1-methyl-3-cyclohexenecarboxylate by determination of double bonds, and 0.2 percent acidic impurities calculated as acetic acid. The yield of diepoxide was 84 percent.

The residue product (75 grams) was distilled without fractionation to yield 67 grams of colorless liquid, B.P. 180° C.–195° C. at 3 mm., $n_D^{30}$ 1.4855, which analyzed 83.5 percent 3,4-epoxy-1-methylcyclohexylmethyl 3,4-epoxy-1-methylcyclohexanecarboxylate by analysis for epoxide groups and 1.95 percent 1-methyl-3-cyclohexenylmethyl 1-methyl-3-cyclohexenecarboxylate by analysis for double bonds.

*Example 3*

PREPARATION OF 6-METHYL-3,4-EPOXYCYCLOHEXYLMETHYL 6-METHYL-3,4-EPOXYCYCLOHEXANECARBOXYLATE

To 620 grams (2.5 mols) of 6-methyl-3-cyclohexenylmethyl 6-methyl-3-cyclohexenecarboxylate in a 5-liter flask was added dropwise over a period of six and one-half hours 2690 grams of a 21.6 percent solution of peracetic acid in acetone (570 grams, 7.5 mols, of peracetic acid). The contents of the flask were stirred and maintained at 40° C. during the addition by immersing the reaction flask in a water bath. After addition was complete, the reaction conditions were maintained for an additional one-half hour and then the reaction flask was immersed in a cold bath at −11° C. for 16 hours. Analysis at the end of this period indicated 98.7 percent of the theoretical amount of peracetic acid was used up. The reaction solution was then heated to 42° C. and maintained there for an additional one and one-half hours, and then analysis indicated 100 percent of the theoretical amount of peracetic acid had been consumed.

The reaction solution was then added dropwise to a still kettle containing 1400 grams of ethyl benzene refluxing at 25 mm. pressure. Acetone, peracetic acid, acetic acid and ethyl benzene were distilled off at the head during the addition, and after addition was complete all low-boiling material was stripped off up to a kettle temperature of 60° C. at 1 mm. There was obtained 736 grams of residue product which analyzed 85.4 percent purity as 6-methyl-3,4-epoxycyclohexylmethyl 6-methyl-3,4-epoxycyclohexanecarboxylate by determination of epoxide groups, 3.1 percent as unreacted 6-methyl-3-cyclohexenemethyl 6-methyl-3-cyclohexenecarboxylate by determination of double bonds, and 0.3 percent acidity as acetic acid. The yield corresponded to 89.8 percent.

By distilling a sample of the crude diepoxide under reduced pressure there was obtained a purified product. It was a colorless, sweet-smelling liquid having the following properties: B.P. 335° C. at 760 mm., 185° C.–186°C. at 3 mm.; $n_D^{30}$ 1.4880.

*Example 4*

PREPARATION OF 3,4-EPOXY-(3 AND/OR 4)-METHYLCYCLOHEXYLMETHYL 3,4 - EPOXY - (3 AND/OR 4)-METHYLCYCLOHEXANECARBOXYLATE

The Diels-Alder adduct of isoprene and acrolein was subjected to a Tischenko condensation as described in Example 1. Upon distillation under reduced pressure there was obtained in good yield (3 and/or 4)-methyl-3-cyclohexenymethyl (3 and/or 4)-methyl-3-cyclohexenecarboxylate, a colorless liquid boiling at 160° C.–164° C. at 3 mm. pressure. To 0.371 mol of this mixture of isomeric esters was added a 25 percent peracetic acid (1.11 mols) solution in acetone over a period of 1.33 hours at 40° C. After an additional 2 hour reaction period the reaction mixture was added to 500 cc. of ethylbenzene (to facilitate removal of the acetic acid) and distilled. The product was a mixture of isomers boiling at 187° C.–195° C. at 3 mm. and having a refractive index range of 1.4822–1.4830 ($n_D^{30}$). The purity, as determined by an analysis for epoxide groups by the pyridine hydrochloride method, was 95 percent calculated as 3,4-epoxy-(3 and/or 4)-methylcyclohexylmethyl 3,4-epoxy-(3 and/or 4)-methylcyclohexanecarboxylate.

*Example 5*

PREPARATION OF 3,4-EPOXY-(2 AND/OR 5)-METHYLCYCLOHEXYLMETHYL 3,4 - EPOXY - (2 AND/OR 5)-METHYLCYCLOHEXANECARBOXYLATE

The Diels-Alder adduct of piperylene and acrolein was subjected to a Tischenko condensation as described in Example 1. Upon distillation under reduced pressure there was obtained in good yield 2-methyl-3-cyclohexenylmethyl 2-methyl-3-cyclohexenecarboxylate, a colorless liquid boiling at 146° C.–147° C. at 3.0 mm. and having a refractive index of 1.4906 ($n_D^{30}$). To 0.387 mol of this ester was added over a period of 1.67 hours at a 25 percent solution of peracetic acid (1.16 mols) in acetone at 40° C. After an additional 2 hours reaction period, the reaction mixture was added to 500 cc. of ethylbenzene (to facilitate the removal of acetic acid) and the volatile components were removed to a kettle temperature of 70° C. at 3 mm. pressure. The residue product (108 grams) analyzed 90 percent of the corresponding diepoxide. The residue product was fractionated on a short column and gave a 79 percent yield of 3,4-epoxy-2-methylcyclohexylmethyl 3,4-epoxy-2-methylcyclohexanecarboxylate, a colorless liquid having a boiling point of 183° C.–185° C. at 2 mm. and a refractive index of 1.4927 ($n_D^{30}$). The purity was 99.5 percent as determined by a pyridine hydrochloride analysis for epoxide.

*Example 6*

REACTION OF ADIPIC ACID WITH 3,4-EPOXY-6-METHYLCYCLOHEXYLMETHYL 3,4-EPOXY - 6 - METHYLCYCLOHEXANECARBOXYLATE

Adipic acid was mixed with 3,4-epoxy-6-methylcyclohexylmethyl 3,4-epoxy-6-methylcyclohexanecarboxylate in various molar ratios and the mixtures were heated until homogeneous. Gelation occurred in five minutes at a temperature of 140° C. After curing for six hours at a temperature of 160° C., clear, light amber colored resins were obtained having the following physical properties.

| Weight of Epoxide, Grams | Weight of Adipic Acid, Grams | Mole Ratio, Acid/Epoxide | Heat distortion,[1] 264 p.s.i., °C. | Izod [2] Impact |
|---|---|---|---|---|
| 41.3 | 8.7 | 0.4 | 70 | ---- |
| 39.8 | 10.2 | 0.5 | 84 | 0.41 |
| 37.5 | 12.4 | 0.6 | 85 | 0.43 |
| 35.9 | 14.1 | 0.75 | 76 | 0.42 |
| 34.0 | 16.0 | 0.9 | 59 | 0.25 |
| 32.8 | 17.2 | 1.0 | 50 | 0.25 |

[1] ASTM Method D-648-45T.
[2] ASTM Method D-256-47T.

*Example 7*

REACTION OF SEBACIC ACID WITH 3,4-EPOXY-6-METHYLCYCLOHEXYLMETHYL 3,4-EPOXY - 6 - METHYLCYCLOHEXANECARBOXYLATE

Sebacic acid (18 grams) was mixed with 3,4-epoxy-6-methylcyclohexylmethyl 3,4-epoxy-6-methylcyclohexanecarboxylate (32 grams) in the ratio of 0.78 mol of acid to 1.0 mol of 3,4-epoxy-6-methylcyclohexylmethyl 3,4-epoxy-6-methylcyclohexanecarboxylate. The mixture was heated until homogeneous and gelatin took place in thirty minutes at a temperature of 160° C. The cure was continued for a period of four hours at a temperature of 160° C., whereupon a clear, amber-colored resin was obtained having the following physical properties.

Izod impact, ft. lb./in. notch _____ 0.43
Heat distortion (264 p.s.i.) _____° C__ 61
Flexural modulus _____ 0.461×10⁶
Shore D hardness _____ 82

*Example 8*

REACTION OF DICARBOXYLIC ACIDS WITH 3,4-EPOXY-6-METHYLCYCLOHEXYLMETHYL 3,4-EPOXY-6-METHYLCYCLOHEXANECARBOXYLATE

Glutaric acid (1.32 grams) was mixed with 3,4-epoxy-6-methylcyclohexylmethyl 3,4-epoxy - 6 - methylcyclohexanecarboxylate (2.80 grams) in the ratio of one mol of acid to one mole of 3,4-epoxy-6-methylcyclohexylmethyl 3,4-epoxy-6-methylcyclohexanecarboxylate. The mixture was heated until homogeneous and the heating was continued at a temperature of 120° C. whereupon gelation occurred after eight minutes. After curing for 22 hours at a temperature of 120° C., a hard, tough, amber-colored resin was obtained.

Pimelic acid (1.60 grams) was mixed with 3,4-epoxy-6-methylcyclohexylmethyl 3,4-epoxy - 6 - methylcyclohexanecarboxylate (2.80 grams). The mixture was heated until homogeneous and the heating continued at a temperature of 120° C. whereupon gelation occurred in eight minutes. After curing for 22 hours at 120° C., a hard, tough, amber-colored resin was obtained.

Azelaic acid (1.88 grams) was mixed with 3,4-epoxy-6-methylcyclohexylmethyl 3,4-epoxy-6-methylcyclohexanecarboxylate (2.80 grams) and the mixture heated until homogeneous. The heating was continued at a temperature of 120° C. for a total period of 22 hours whereupon a tough, hard, amber-colored resin was obtained.

Example 9

VARIATION IN THE MOLE RATIO OF ADIPIC ACID AND 3,4 - EPOXY - 6 - METHYLCYCLOHEXYLMETHYL 3,4-EPOXY-6-METHYLCYCLOHEXANECARBOXYLATE

The proportions of adipic acid and 3,4-epoxy-6-methylcyclohexylmethyl 3,4 - epoxy - 6 - methylcyclohexanecarboxylate were varied over a wide range in order to determine the limits of the application of dicarboxylic acids. The data below indicate that the dicarboxylate acids can be employed when used in the range of from 0.1 to 1.5 moles of acid per mole of 3,4-epoxy-6-methylcyclohexylmethyl 3,4-epoxy-6-methylcyclohexanecarboxylate.

| Weight of Epoxide, Grams | Weight of Adipic Acid, Grams | Mole Ratio Acid/Epoxide | Cure | Characteristics of Product at 27° C. |
|---|---|---|---|---|
| 2.8 | 0.15 | 0.1 | 25 hrs. at 140° C | hard, weak, brittle. |
| 2.8 | 0.30 | 0.2 | ___do___ | Do. |
| 2.8 | 0.73 | 0.5 | 3 hrs. at 140° C | hard and tough. |
| 2.8 | 1.5 | 1.0 | ___do___ | Do. |
| 2.8 | 1.8 | 1.25 | ___do___ | Do. |
| 2.8 | 2.2 | 1.5 | 5 hrs. at 140° C | fairly hard. |
| 2.8 | 2.9 | 2.0 | 7 hrs. at 140° C | soft. |
| 1.4 | 1.8 | 2.5 | 17 hrs. at 140° C | opaque, soft. |

Example 10

REACTION OF ALKENYLSUCCINIC ACID WITH 3,4-EPOXY-6-METHYLCYCLOHEXYLMETHYL 3,4 - EPOXY-6-METHYLCYCLOHEXANECARBOXYLATE 2-ethylbutenylsuccinic acid (13.0 grams) and 3,4-epoxy-6-methylcyclohexylmethyl 3,4-epoxy - 6 - methylcyclohexanecarboxylate (37.0 grams) were mixed in the proportions of 0.5 mole of acid to 1.0 mole of 3,4-epoxy-6-methylcyclohexylmethyl 3,4-epoxy-6-methylcyclohexanecarboxylate. The mixture was heated until a uniform melt was obtained. The mixture gelled within five minutes when heated at a temperature of 120° C. A clear, light-colored resin was obtained after curing for two hours at a temperature of 120° C. and for four hours at a temperature of 160° C. The product had a Barcol hardness of 27.

Example 11

REACTION OF OXALIC ACID WITH 3,4-EPOXY-6-METHYLCYCLOHEXYLMETHYL 3,4-EPOXY - 6 - METHYLCYCLOHEXANECARBOXYLATE

A solution of 0.9 gram (0.01 mole) of oxalic acid in one gram of methyl butyl ketone and five grams of acetone was mixed with 5.6 grams (0.02 mole) of 3,4-epoxy-6-methylcyclohexylmethyl 3,4-epoxy - 6 - methylcyclohexanecarboxylate. The solution was spread on a glass surface with a glass rod and allowed to stand for one hour at room temperature. As soon as the solvent had evaporated, the film set to a soft gel at room temperature. After further baking for one hour at a temperature of 100° C., the product was a clear, hard, tough resin.

Example 12

REACTION OF GLUTARIC ACID WITH 3,4-EPOXYCYCLOHEXYLMETHYL 3,4 - EPOXYCYCLOHEXANECARBOXYLATE

Glutaric acid (0.66 gram) and 3,4-epoxycyclohexylmethyl 3,4-epoxycyclohexanecarboxylate (1.26 grams) were mixed in equal molar proportions and heated until homogeneous. The mixture gelled in five minutes at a temperature of 110° C. and was cured for one hour at a temperature of 160° C. The resin obtained was hard, tough and light-amber in color.

Example 13

REACTION OF GLUTARIC ACID WITH 3,4-EPOXY-3 (or 4)-METHYLCYCLOHEXYLMETHYL 3,4-EPOXY-3 (or 4)-METHYLCYCLOHEXANECARBOXYLATE

Glutaric acid and 3,4-epoxy-3(or 4)-methylcyclohexylmethyl 3,4-epoxy-3(or 4)-methylcyclohexanecarboxylate were mixed in equal molar proportions and the mixture heated until homogeneous. The mixture was maintained at a temperature of 200° C. for ten hours. At the end of this time, a resin was obtained which was fairly soft at room temperature.

Example 14

REACTION OF GLUTARIC ACID CONTAINING 30% GLUTARIC ANHYDRIDE WITH 3,4-EPOXY-6-METHYLCYCLOHEXYLMETHYL 3,4 - EPOXY - 6 - METHYLCYCLOHEXANECARBOXYLATE

Glutaric acid (13.6 grams) which contained 30% of glutaric anhydride was mixed with 3,4-epoxy-6-methylcyclohexylmethyl 3,4 - epoxy - 6 - methylcyclohexanecarboxylate (36.4 grams) in the ratio of 0.56 mole of acid to 0.27 mole of anhydride to 1.0 mole of diepoxide. The mixture was heated to a temperature of 120° C. and after eight minutes gelation occurred. The cure was continued for four hours at a tempertaure of 120° C. and for an additional two hours at 160° C. An amber-colored resin was produced, characterized by the following physical properties.

Izod impact, ft. lb./in. notch _____ 0.41
Heat distortion (264 p.s.i.) _____° C____ 101
Flexural modulus _____ 0.395×10⁶
Shore D hardness _____ 86

Example 15

CONDENSATION OF MALEIC ANHYDRIDE WITH ETHYLENE GLYCOL AND SUBSEQUENT REACTION WITH 3,4 - EPOXY - 6 - METHYLCYCLOHEXYLMETHYL 3,4-EPOXY-6-METHYLCYCLOHEXANECARBOXYLATE

Maleic anhydride (93 grams) and ethylene glycol (31 grams) were condensed in the ratio of 1.9 moles of anhydride to 1.0 mole of glycol. The water was removed by distillation at a temperature in the range of 180° C.–200° C. The acid-ester this produced had an equivalent weight of 163.

The acid-ester (3.3 grams) was mixed with 3,4-epoxy-6-methylcyclohexylmethyl 3,4-epoxy-6-methylcyclohexanecarboxylate (5.6 grams); the reaction was exothermic at room temperature. A hard, strong resin was obtained after curing for two hours at a temperature of 160° C.

Example 16

CONDENSATION OF PHTHALIC ANHYDRIDE WITH ETHYLENE GLYCOL AND SUBSEQUENT REACTION WITH 3,4 - EPOXY - 6 - METHYLCYCLOHEXYLMETHYL 3,4-EPOXY-6-METHYLCYCLOHEXANECARBOXYLATE

Phthalic anhydrate (148 grams) and ethylene glycol (31 grams) were condensed in the ratio of 2 moles of anhydride to one mole of glycol. The acid-polyester had an equivalent weight of 216 (216 grams of ester per carboxy group).

The acid-ester (4.3 grams) was mixed with 3,4-epoxy-6-methylcyclohexylmethyl 3,4-epoxy-6-methylcyclohexanecarboxylate (5.6 grams) and heated to a temperature of 100° C. Gelation of the product occurred in eight minutes. A further cure at a temperature of 160° C. was maintained for a period of six hours and the product produced was a strong, tough resin having a Barcol hardness of 32.

Example 17

CONDENSATION OF DICHLOROMALEIC ANHYDRIDE WITH ETHYLENE GLYCOL AND SUBSEQUENT REACTION WITH 3,4-EPOXY-6-METHYLCYCLOHEXYLMETHYL 3,4-EPOXY - 6 - METHYLCYCLOHEXANECARBOXYLATE

Dichloromaleic anhydride (167 grams) and ethylene glycol (31.0 grams) were condensed in the ratio of two moles of anhydride to one mole of glycol. An amber colored product was obtained which was a low melting solid at room temperature.

The acid-ester (4 grams) and 3,4-epoxy-6-methylcyclohexylmethyl 3,4-epoxy-6-methylcyclohexanecarboxylate (5.6 grams) were mixed at room temperature. The reaction was exothermic while mixing. A hard, strong resin was obtained after heating at a temperature of 160° C. for a period of two hours. The product had a Barcol hardness of 34.

*Example 18*

CONDENSATION OF SUCCINIC ANHYDRIDE WITH ETHYLENE GLYCOL AND SUBSEQUENT REACTION WITH 3,4 - EPOXY - 6 - METHYLCYCLOHEXYLMETHYL 3,4-EPOXY-6-METHYLCYCLOHEXANECARBOXYLATE

Succinic anhydride was condensed with ethylene glycol in varying proportions at a temperature of 180° C.–200° C. Water formed in the esterification was removed by distillation. These acid-esters were then mixed with separate samples of 3,4-epoxy-6-methylcyclohexylmethyl 3,4-epoxy-6-methylcyclohexanecarboxylate and heated to a temperature of 160° C. for a period of six hours. The characteristics of the resins thus obtained are tabulated below.

| Ratio of Succinic Anhydride to Ethylene Glycol | Equivalent Weight of Ester-Acid | Weight of Acid-Ester | Weight of Epoxide | Characteristics of Resin |
|---|---|---|---|---|
| 1.5:1 | 212 | 4.2 | 5.6 | Tough, Barcol 5. |
| 1.75:1 | 180 | 3.6 | 5.6 | Tough, Barcol 18. |
| 2.0:1 | 149 | 2.6 | 5.6 | Do. |

Similar results are obtainable when other diepoxides such as, for example, 3,4-epoxycyclohexylmethyl 3,4-epoxycyclohexanecarboxylate; 3,4-epoxy-1-methylcyclohexylmethyl 3,4-epoxy-1-methylcyclohexanecarboxylate; 3,4-epoxy-2-methylcyclohexylmethyl 3,4-epoxy-2-methylcyclohexanecarboxylate; 3,4-epoxy-3(or 4)-methylcyclohexylmethyl 3,4-epoxy-3(or 4)-methylcyclohexanecarboxylate are substituted for the diepoxide used above and the acid-ester of equivalent weight of 149.

A bar was cast of the resin prepared from 3,4-epoxy-6-methylcyclohexylmethyl 3,4-epoxy-6-methylcyclohexanecarboxylate and the 149-equivalent weight acid-ester. After curing for six hours at a temperature of 160° C. the resin had the following physical properties.

Izod impact, ft.lb./in.notch, 25° C.[1] _____ 0.5
Heat distortion (264 p.s.i.)[2] _____° C__ 65

[1] ASTM Method D–256–47T.
[2] ASTM Method D–648–45T.

*Example 19*

CONDENSATION OF ADIPIC ACID WITH GLYCEROL AND SUBSEQUENT REACTION WITH 3,4-EPOXY-6-METHYLCYCLOHEXYLMETHYL 3,4-EPOXY - 6 - METHYLCYCLOHEXANECARBOXYLATE.

Adipic acid (146 grams) and glycerol (29.0 grams) were mixed in the molar ratio of three moles of acid to one mole of glycerol in a round-bottomed flask and heated to a temperature of 200° C. for a period of three hours during which the water formed during the esterification was removed. The acid-polyester was a soft solid at room temperature.

The acid-polyester (2.4 grams) was mixed with 3,4-epoxy-6-methylcyclohexylmethyl 3,4-epoxy-6-methylcyclohexanecarboxylate (4.4 grams) and the mixture heated to a temperature of 100° C. until gelation occurred (two hours). After an additional curing for a period of six hours, a strong, tough resin was obtained, characterized by the following physical properties.

Barcol hardness _____ 9
Izod impact, ft. lb./in. notch, 25° C. _____ 0.9
Heat distortion (264 p.s.i.) _____° C__ 68

*Example 20*

CONDENSATION OF SUCCINIC ANHYDRIDE WITH GLYCEROL AND SUBSEQUENT REACTION WITH 3,4-EPOXY-6-METHYLCYCLOHEXYLMETHYL 3,4-EPOXY-6-METHYLCYCLOHEXANECARBOXYLATE

Succinic anhydride (110 grams) and glycerol (31.0 grams) in the mole ratio of three moles of anhydride to one mole of glycerol were mixed in a round-bottomed flask and heated to a temperature of 135° C.–145° C. for a period of seven hours. The product was a light yellow liquid at a temperature of 100° C. and a semi-solid at room temperature. This product (2.6 grams) was mixed with 3,4-epoxy-6-methylcyclohexylmethyl 3,4-epoxy-6-methylcyclohexanecarboxylate (5.6 grams) and heated slowly until homogeneous. Gelation occurred in three minutes at a temperature of 100° C. After curing for an additional two hours at a temperature of 160° C., a strong, tough resin was obtained which had a Barcol hardness of 28.

*Example 21*

CONDENSATION OF SUCCINIC ANHYDRIDE WITH PENTAERYTHRITOL AND SUBSEQUENT REACTION WITH 3,4 - EPOXY - 6 - METHYLCYCLOHEXYLMETHYL 3,4-EPOXY-6-METHYLCYCLOHEXANECARBOXYLATE

Succinic anhydride (120 grams) and pentaerythritol (34 grams) were mixed in the mole ratio of four moles of anhydride to one mole of pentaerythritol in a round-bottomed flask and heated to a temperature of 130° C.–140° C. for a period of six hours. The product produced was a light yellow liquid at a temperature of 100° C. and a solid at room temperature. This product (2.6 grams) was mixed with 3,4-epoxy-6-methylcyclohexylmethyl) 3,4-epoxy-6-methylcyclohexanecarboxylate (5,6 grams) and heated slowly until homogeneous. The mixture gelled within one hour at a temperature of 70° C. and after an additional cure for a period of four hours at a temperature of 160° C., a tough, strong resin was obtained which had the following physical properties.

Barcol hardness _____ 30
Izod impact, ft.lb./in. notch, 25° C. _____ 0.4
Heat distortion (264 p.s.i.) _____° C__ 123

*Example 22*

REACTION OF 3,4 - EPOXY - 6 - METHYLCYCLOHEXYLMETHYL 3,4-EPOXY - 6 - METHYLCYCLOHEXANECARBOXYLATE WITH THE ACID-ESTER OF SUCCINIC ACID AND GLYCEROL MODIFIED BY THE ADDITION OF PHTHALIC ANHYDRIDE 3,4-epoxy-6-methylcyclohexylmethyl 3,4-epoxy-6-methylcyclohexanecarboxylate (17.2 grams), phthalic anhydride (3.0 grams) and 9.8 grams of the acid-ester of succinic anhydride and glycerol (the adduct of three moles of succinic anhydride with one mole of glycerol) were mixed in the proportions of 1:0.33:0.44, respectively. The mixture was heated until homogeneous and maintained at a temperature of 120° C. Gelation occurred in one minute. Upon heating for an additional two hours at a temperature of 120° C. and for an additional six hours at a temperature of 160° C., there was obtained a pale yellow colored resin which had the following physical properties:

Heat distortion point,[1] 264 p.s.i. _____° C__ 96
Izod impact,[2] ft.lbs./in. notch, 25° C. _____ 0.1

[1] ASTM Method D–648–45T.
[2] ASTM Method D–256–47T.

*Examples 23 through 50*

Tabulated below are various examples of the resin compositions of the invention produced in accordance with the process of this invention. These compositions were prepared in a manner similar to the previous examples. The table reflects the variation in physical properties with the addition of a modifying polycarboxylic acid compound, a variation in the mole ratio of reactants, a variation in the catalyst or the amount of catalyst employed.

| Ex. | Diepoxide | Polycarboxylic Acid Compound | Carboxyl Equivalency to Epoxy Equivalency | Gel Time, Min. at Temp., °C. | Cure Time, Hours at Temp., °C. | Heat Dist., °C. | Barcol Hard. | Izod Impact | Modifier |
|---|---|---|---|---|---|---|---|---|---|
| 23 | (a) | Isosebacic Acid | 0.6:1.0 | | 10-160 | 86 | 22 | 0.5 | |
| 24 | (a) | do | 0.9:1.0 | | 10-160 | 54 | 15 | 0.7 | |
| 25 | (a) | Sebacic Acid | 0.5:1.0 | | 6-160 | 40 | 10 | 0.4 | |
| 26 | (a) | do | 0.6:1.0 | | 6-160 | 54 | 11 | 0.5 | |
| 27 | (a) | do | 0.75:1.0 | | 6-160 | 55 | 11 | 0.4 | |
| 28 | (a) | do | 0.9:1.0 | | 6-160 | 46 | 8 | 0.3 | |
| 29 | (a) | do | 1.0:1.0 | | 6-160 | 30 | 0 | | |
| 30 | (a) | Ethylbutenyl Succinic Acid. | 0.4:1.0 | | 6-160 | 82 | 32 | 0.3 | |
| 31 | (a) | do | 0.6:1.0 | | 6-160 | 116 | 32 | 0.5 | |
| 32 | (a) | do | 0.6:1.0 | 5-120 | 4-160 | 115 | 27 | 0.6 | |
| 33 | (a) | Glutaric Acid | 0.6:1.0 | | 6-160 | 93 | 35 | 0.6 | |
| 34 | (a) | Pimelic Acid | 0.6:1.0 | | 6-160 | 85 | 23 | 0.4 | |
| 35 | (a) | Azelaic Acid | 0.6:1.0 | | 6-160 | 68 | 15 | 0.4 | |
| 36 | (a) | Succinic Acid Glycerol. | 0.4:1.0 | | 6-160 | 86 | 35 | 0.4 | |
| 37 | (a) | do | 0.5:1.0 | | 6-160 | 102 | 39 | 0.4 | |
| 38 | (a) | do | 0.6:1.0 | | 6-160 | 110 | 38 | 0.6 | |
| 39 | (a) | do | 0.7:1.0 | | 6-160 | 93 | 39 | 0.4 | |
| 40 | (a) | do | 0.5:1.0 | | 1-160 | 90 | 35 | 0.4 | |
| 41 | (a) | do | 0.6:1.0 | | 1-160 | 95 | 37 | 0.5 | |
| 42 | (a) | do | 0.7:1.0 | | 1-160 | 89 | 34 | 0.6 | |
| 43 | (a) | Succinic Acid-1,2,6-hexanetriol. | 0.5:1.0 | | 6-160 | 100 | 33 | 0.9 | |
| 44 | (a) | Succinic Acid-Pentaerythritol. | 0.5:1.0 | | 4-160 | 123 | 30 | 0.3 | |
| 45 | (a) | Adipic Acid-Glycerol. | 0.5:1.0 | | 6-160 | 68 | | 0.9 | |
| 46 | (a) | Succinic Acid-Ethylene Glycol. | 0.5:1.0 | | 6-160 | 65 | | 0.5 | |
| 47 | (a) | Methyltetrahydrophthalic Acid-Glycerol. | 0.6:1.0 | | 6-160 | 135 | 44 | 0.3 | |
| 48 | (a) | do | 0.7:1.0 | | 6-160 | 131 | 42 | 0.4 | |
| 49 | (a) | Succinic Acid-Trimethylolpropane. | 0.6:1 | | 6-160 | 65 | 27 | 0.2 | |
| 50 | (a) | do | 0.5:1 | | 6-160 | 96 | 26 | 0.3 | | a 3,4-epoxy-6-methylcyclohexylmethyl 3,4-epoxy-6-methylcyclohexanecarboxylate.

Example 51

VARIATION IN THE MOLE RATIO OF 3,4-EPOXY-6-METHYLCYCLOHEXYLMETHYL 3,4-EPOXY-6-METHYLCYCLOHEXANE CARBOXYLATE AND THE ACID-ESTER PARTNER

The succinic anhydride-ethylene glycol condensate having an equivalent weight of 149 (Example 13) was combined with 3,4-epoxy-6-methyl-cyclohexylmethyl 3,4-epoxy-6-methylcyclohexanecarboxylate in various proportions to determine the limits in the mole ratio of reactants necessary to produce a useful resin.

| Carboxy Groups/Mol Diepoxide | Carboxyl Equiv./ Epoxy Equiv. | Observations |
|---|---|---|
| 0.2 | .1 | Soft resin after cure of 10 hrs. at 140° C. |
| 0.4 | .2 | Gel 3.5 hrs. at 140° C., Barcol, 0.[1] |
| 1.0 | 0.5 | Gel 28 min. at 140° C., Barcol, 23.[1] |
| 1.5 | 0.75 | Gel 28 min. at 140° C., Barcol, 23.[1] |
| 2.0 | 1.0 | Gel 28 min. at 140° C., Barcol, 10.[1] |
| 2.5 | 1.25 | Gel 3.5 hrs. at 140° C., Barcol, 0.[1] |
| 3.0 | 1.5 | Soft resin after cure of 10 hrs. at 140° C. |

[1] Barcol hardness on resin at 25° C., after 10 hours cure at 140° C.

Example 52

THE APPLICATION OF ACID-ESTERS-3,4-EPOXY-6-METHYLCYCLOHEXYLMETHYL 3,4-EPOXY-6-METHYLCYCLOHEXANECARBOXYLATE AS SURFACE COATINGS

The acid-ester prepared from three moles of succinic anhydride and one mole of glycerol, as shown in Example 15, was mixed with 3,4-epoxy-6-methylcyclohexylmethyl 3,4-epoxy-6-methylcyclohexanecarboxylate in the proportion of one carboxy equivalent for .5 epoxy equivalent of 3,4-epoxy-6-methylcyclohexylmethyl 3,4-epoxy-6-methylcyclohexanecarboxylate. The mixture was heated to a temperature of 130° C. and the reaction mixture became viscous in about five minutes, whereupon the reaction was stopped by rapid cooling. The mixture was a solid at room temperature. The resin was then dissolved by heating in an equal weight of methyl isobutyl ketone. The solution thus formed was applied to a glass surface as a thin film and air-dried for one hour at a temperature of 50° C. The film was cured for an additional hour at a temperature of 160° C. and there was produced a film which was tough, solvent resistant, scratch resistant, and had excellent adhesion.

What is claimed is:

1. A polymerizable, curable, composition comprising (a) a 3,4-epoxycyclohexylmethyl 3,4-epoxycyclohexane-carboxylate corresponding to the structural formula:

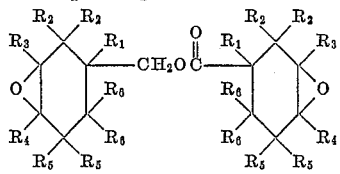

wherein $R_1$ through $R_6$ represent members selected from the group consisting of hydrogen and lower alkyl groups; (b) a polycarboxylic acid in an amount having $y$ carboxyl equivalents per epoxy equivalent of said said diepoxide; and (c) a polycarboxylic acid anhydride in an amount having $x$ carboxyl equivalents per epoxy equivalent of said diepoxide, wherein $y$ is a number in the range of from 0.1 to 1.5; $x$ is a number in the range from 0.0 to 1.0; the sum of $x$ and $y$ is not greater than 2.0 and $x/y$ is less than 1 when $x$ is greater than 0.0.

2. A polymerizable, curable, composition comprising (a) a 3,4-epoxycyclohexylmethyl 3,4-epoxycyclohexane-carboxylate corresponding to the structural formula:

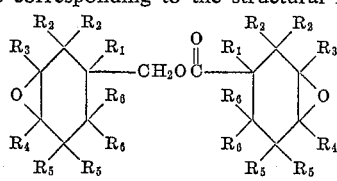

wherein $R_1$ through $R_6$ represent members selected from the group consisting of hydrogen and lower alkyl groups; (b) a polycarboxylic acid in an amount having $y$ carboxyl equivalents per epoxy equivalent of said diepoxide; and (c) a polycarboxylic acid anhydride in an amount having x carboxyl equivalents per epoxy equivalent of said diepoxide, wherein y is a number in the range from 0.4 to 1.0; x is a number in the range from 0.0 to 0.5; the sum of x and y is not greater than 1.0 and x/y is less than 1 when x is greater than 0.0.

3. A polymerizable, curable, composition comprising (a) a lower alkyl 3,4-epoxycyclohexylmethyl 3,4-epoxycyclohexanecarboxylate corresponding to the structural formula:

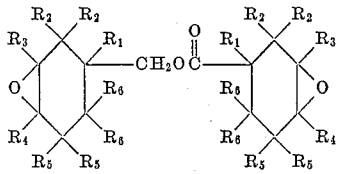

wherein $R_1$ through $R_6$ represent lower alkyl groups; (b) a polycarboxylic acid in an amount having y carboxyl equivalents per epoxy equivalent of said diepoxide; and (c) a polycarboxylic acid anhydride in an amount having x carboxyl equivalents per epoxy equivalent of said diepoxide, wherein y is a number in the range from 0.1 to 1.5; x is a number in the range from 0.0 to 1.0; the sum of x and y is not greater than 2.0 and x/y is less than 1 when x is greater than 0.0.

4. A polymerizable, curable, composition comprising (a) 3,4-epoxy-6-methylcyclohexylmethyl 3,4-epoxy-6-methylcyclohexanecarboxylate; (b) a polycarboxylic acid in an amount having y carboxyl equivalents per epoxy equivalent of said diepoxide; and (c) a polycarboxylic acid anhydride in an amount having x carboxyl equivalents per epoxy equivalent of said diepoxide, wherein y is a number in the range of from 0.1 to 1.5; x is a number in the range from 0.0 to 1.0; the sum of x and y is not greater than 2.0 and x/y is less than 1 when x is greater than 0.0.

5. A polymerizable, curable, composition comprising (a) 3,4-epoxycyclohexylmethyl 3,4-epoxycyclohexanecarboxylate; (b) a polycarboxylic acid in an amount having y carboxyl equivalents per epoxy equivalent of said diepoxide; and (c) a polycarboxylic acid anhydride in an amount having x carboxyl equivalents per epoxy equivalent of said diepoxide, wherein y is a number in the range from 0.1 to 1.5; x is a number in the range from 0.0 to 1.0; the sum of x and y is not greater than 2.0 and x/y is less than 1 when x is greater than 0.0.

6. A polymerizable, curable, composition comprising (a) 3,4-epoxy-1-methylcyclohexylmethyl 3,4-epoxy-1-methylcyclohexanecarboxylate; (b) a polycarboxylic acid in an amount having y carboxyl equivalents per epoxy equivalent of said diepoxide; and (c) a polycarboxylic acid anhydride in an amount having x carboxyl equivalents per epoxy equivalent of said diepoxide, wherein y is a number in the range from 0.1 to 1.5; x is a number in the range from 0.0 to 1.0; the sum of x and y is not greater than 2.0 and x/y is less than 1 when x is greater than 0.0.

7. The polymerized, cured product obtained by heating the composition of claim 4.

8. The polymerized, cured product obtained by heating the composition of claim 5.

9. The polymerized, cured product obtained by heating the composition of claim 6.

10. Polymerizable, curable, compositions comprising (a) a 3,4-epoxycyclohexylmethyl 3,4-epoxycyclohexanecarboxylate corresponding to the structural formula:

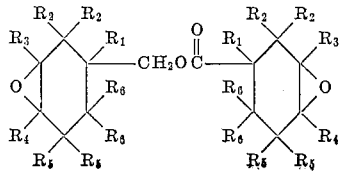

wherein $R_1$ through $R_6$ represent members selected from the group consisting of hydrogen and lower alkyl groups; (b) a polycarboxylic acid selected from the group consisting of aliphatic, aromatic and cycloaliphatic polycarboxylic acids in an amount having y carboxyl equivalents per epoxy equivalent of said diepoxide; and (c) a polycarboxylic acid anhydride selected from the group consisting of aliphatic, aromatic and cycloaliphatic polycarboxylic anhydrides in an amount having x carboxyl equivalents per epoxy equivalent of said diepoxide wherein y is a number in the range of from 0.1 to 1.5; x is a number in the range of from 0.0 to 1.0; the sum of x and y is not greater than 2.0 and x/y is less than 1.0 when x is greater than 0.0.

11. The polymerized, cured product obtained by heating the compositions of claim 10.

12. A polymerizable, curable, composition comprising 3,4-epoxycyclohexylmethyl 3,4-epoxycyclohexanecarboxylate and glutaric acid in an amount having from 0.1 to 1.5 carboxyl equivalents per epoxy equivalent.

13. A polymerizable, curable, composition comprising 3,4-epoxy-3 or 4-methylcyclohexylmethyl 3,4-epoxy-3 or 4-methylcyclohexanecarboxylate and glutaric acid in an amount having from 0.1 to 1.5 carboxyl equivalents per epoxy equivalent.

14. A polymerizable, curable, composition comprising 3,4-epoxy-6-methylcyclohexylmethyl 3,4-epoxy-6-methylcyclohexanecarboxylate, glutaric acid in an amount having from 0.1 to 1.5 carboxyl equivalents per epoxy equivalent, and glutaric anhydride in an amount having from 0.0 to 1.0 carboxyl equivalents per epoxy equivalent.

15. A polymerizable, curable, composition comprising 3,4-epoxy-6-methylcyclohexylmethyl 3,4-epoxy-6-methylcyclohexanecarboxylate and the acid-ester of maleic anhydride and ethylene glycol in an amount having from 0.1 to 1.5 carboxyl equivalents per epoxy equivalent.

16. A polymerizable, curable, composition comprising 3,4-epoxy-6-methylcyclohexylmethyl 3,4-epoxy-6-methylcyclohexanecarboxylate and the acid-ester of phthalic anhydride and ethylene glycol in an amount having from 0.1 to 1.5 carboxyl equivalents per epoxy equivalent.

17. A polymerizable, curable, composition comprising 3,4-epoxy-6-methylcyclohexylmethyl 3,4-epoxy-6-methylcyclo hexanecarboxylate and the acid-ester of dichloromaleic anhydride and ethylene glycol in an amount having from 0.1 to 1.5 carboxyl equivalents per epoxy equivalent.

18. A polymerizable, curable, composition comprising 3,4-epoxy-6-methylcyclohexylmethyl 3,4-epoxy-6-methylcyclohexanecarboxylate and the acid-ester of succinic anhydride and ethylene glycol in an amount having from 0.1 to 1.5 carboxyl equivalents per epoxy equivalent.

19. A polymerizable, curable, composition comprising 3,4-epoxy-6-methylcyclohexylmethyl 3,4-epoxy-6-methylcyclohexanecarboxylate and the acid-ester of adipic acid and glycerol in an amount having from 0.1 to 1.5 carboxyl equivalents per epoxy equivalent.

20. A polymerizable, curable, composition comprising 3,4-epoxy-6-methylcyclohexylmethyl 3,4-epoxy-6-methylcyclohexanecarboxylate and the acid-ester of succinic anhydride and glycerol in an amount having from 0.1 to 1.5 carboxyl equivalents per epoxy equivalent.

21. A polymerizable, curable, composition comprising 3,4-epoxy-6-methylcyclohexylmethyl 3,4-epoxy-6-methylcyclohexanecarboxylate and the acid-ester of succinic anhydride and pentaerythritol in an amount having from 0.1 to 1.5 carboxyl equivalents per epoxy equivalent.

22. A polymerizable, curable, composition comprising 3,4-epoxy-6-methylcyclohexylmethyl 3,4-epoxy-6-methylcyclohexanecarboxylate, the acid-ester of succinic acid and glycerol in an amount having from 0.1 to 1.5 carboxyl equivalents per epoxy equivalent, and phthalic anhydride in an amount having from 0.0 to 1.0 carboxyl equivalents per epoxy equivalent.

23. A polymerizable, curable, composition comprising 3,4-epoxy-6-methylcyclohexylmethyl 3,4-epoxy-6-methyl-cyclohexanecarboxylate and isosebacic acid in an amount having from 0.1 to 1.5 carboxyl equivalents per epoxy equivalent.

24. A polymerizable, curable, composition comprising 3,4-epoxy-6-methylcyclohexylmethyl 3,4-epoxy-6-methyl-cyclohexanecarboxylate and sebacic acid in an amount having from 0.1 to 1.5 carboxyl equivalents per epoxy equivalent.

25. A polymerizable, curable, composition comprising 3,4-epoxy-6-methylcyclohexylmethyl 3,4-epoxy-6-methyl-cyclohexanecarboxylate and ethylbutenyl succinic acid in an amount having from 0.1 to 1.5 carboxyl equivalents per epoxy equivalent.

26. A polymerizable, curable, composition comprising 3,4-epoxy-6-methylcyclohexylmethyl 3,4-epoxy-6-methyl-cyclohexanecarboxylate and glutaric acid in an amount having from 0.1 to 1.5 carboxyl equivalents per epoxy equivalent.

27. A polymerizable, curable, composition comprising 3,4-epoxy-6-methylcyclohexylmethyl 3,4-epoxy-6-methyl-cyclohexanecarboxylate and pimelic acid in an amount having from 0.1 to 1.5 carboxyl equivalents per epoxy equivalent.

28. A polymerizable, curable, composition comprising 3,4-epoxy-6-methylcyclohexylmethyl 3,4-epoxy-6-methyl-cyclohexanecarboxylate and azelaic acid in an amount having from 0.1 to 1.5 carboxyl equivalents per epoxy equivalent.

29. A polymerizable, curable, composition comprising 3,4-epoxy-6-methylcyclohexylmethyl 3,4-epoxy-6-methyl-cyclohexanecarboxylate and the acid-ester of succinic acid and glycerol in an amount having from 0.1 to 1.5 carboxyl equivalents per epoxy equivalent.

30. A polymerizable, curable, composition comprising 3,4-epoxy-6-methylcyclohexylmethyl 3,4-epoxy-6-methyl-cyclohexanecarboxylate and the acid-ester of succinic acid and 1,2,6-hexanetriol in an amount having from 0.1 to 1.5 carboxyl equivalents per epoxy equivalent.

31. A polymerizable, curable, composition comprising 3,4-epoxy-6-methylcyclohexylmethyl 3,4-epoxy-6-methyl-cyclohexanecarboxylate and the acid-ester of succinic acid and pentaerythritol in an amount having from 0.1 to 1.5 carboxyl equivalents per epoxy equivalent.

32. A polymerizable, curable, composition comprising 3,4-epoxy-6-methylcyclohexylmethyl 3,4-epoxy-6-methyl-cyclohexanecarboxylate and the acid-ester of succinic acid and ethylene glycol in an amount having from 0.1 to 1.5 carboxyl equivalents per epoxy equivalent.

33. A polymerizable, curable, composition, comprising 3,4-epoxy-6-methylcyclohexylmethyl 3,4-epoxy-6-methyl-cyclohexanecarboxylate and the acid-ester of methyl-tetrahydrophthalic acid and glycerol in an amount having from 0.1 to 1.5 carboxyl equivalents per epoxy equivalent.

34. A polymerizable, curable, composition comprising 3,4-epoxy-6-methylcyclohexylmethyl 3,4-epoxy-6-methyl-cyclohexanecarboxylate and the acid-ester of succinic acid and trimethylol and propane in an amount having from 0.1 to 1.5 carboxyl equivalents per epoxy equivalent.

References Cited in the file of this patent

UNITED STATES PATENTS

| | | |
|---|---|---|
| 2,623,023 | Koroly | Dec. 23, 1952 |
| 2,712,535 | Fisch | July 5, 1955 |
| 2,716,123 | Frostick et al. | Aug. 23, 1955 |
| 2,720,500 | Cody | Oct. 11, 1955 |
| 2,764,575 | Kohler et al. | Sept. 25, 1956 |
| 2,768,153 | Shokal | Oct. 23, 1956 |